United States Patent [19]

Bowen et al.

[11] Patent Number: 4,477,146
[45] Date of Patent: Oct. 16, 1984

[54] OPTICAL WAVEGUIDE CONNECTOR

[75] Inventors: Terry P. Bowen, Etters; Bernard G. Caron, Harrisburg; Douglas W. Glover, Harrisburg; John C. Hoffer, Harrisburg, all of Pa.

[73] Assignee: AMP Incorporated, Harrisburg, Pa.

[21] Appl. No.: 244,527

[22] Filed: Mar. 16, 1981

[51] Int. Cl.³ .............................................. G02B 7/26
[52] U.S. Cl. ................................. 350/96.21; 350/96.20
[58] Field of Search ................. 350/96.20, 96.21, 96.22

[56] References Cited

U.S. PATENT DOCUMENTS

| 3,948,582 | 4/1976 | Martin | 350/96 C |
| 3,982,815 | 9/1976 | Nakayama | 350/96 C |
| 3,999,837 | 12/1976 | Bowen et al. | 350/96 C |
| 4,015,894 | 4/1977 | Rocton | 350/96 C |
| 4,087,158 | 5/1978 | Lewis et al. | 350/96.21 |
| 4,179,186 | 12/1979 | Tynes | 350/96.21 |
| 4,186,997 | 2/1980 | Schumacher | 350/96.21 |
| 4,240,695 | 12/1980 | Evans | 350/96.21 |
| 4,354,731 | 10/1982 | Mouissie | 350/96.20 |
| 4,355,862 | 10/1982 | Kock | 350/96.20 |

FOREIGN PATENT DOCUMENTS

| 2616876 | 10/1977 | Fed. Rep. of Germany | 350/96.20 |
| 2389148 | 12/1978 | France | 350/96.21 |
| 96911 | 7/1980 | Japan | 350/96.20 |

OTHER PUBLICATIONS

Millet, *IBM Technical Disclosure Bulletin*, vol. 14, No. 3, Aug. 1971, p. 725, "Connector Mount For Fiber Optic Bundle".

Primary Examiner—John D. Lee
Assistant Examiner—Frank González
Attorney, Agent, or Firm—Richard B. O'Planick; Adrian J. LaRue

[57] ABSTRACT

A connector plug for axially aligning an optical fiber in a receptacle bore is disclosed, comprising an elongate body having an axial passageway receiving the fiber therein, and a forward alignment nose portion having a profiled opening receiving a forward end of the fiber. The opening is defined by opposed V-grooves, with the V-grooves being separated by a transverse slot extending through the alignment nose portion. The nose portion further comprises external protrusion means for engaging the receptacle, and causing the opposed V-grooves to wedge against the fiber extending therebetween, for fiber centering.

8 Claims, 6 Drawing Figures

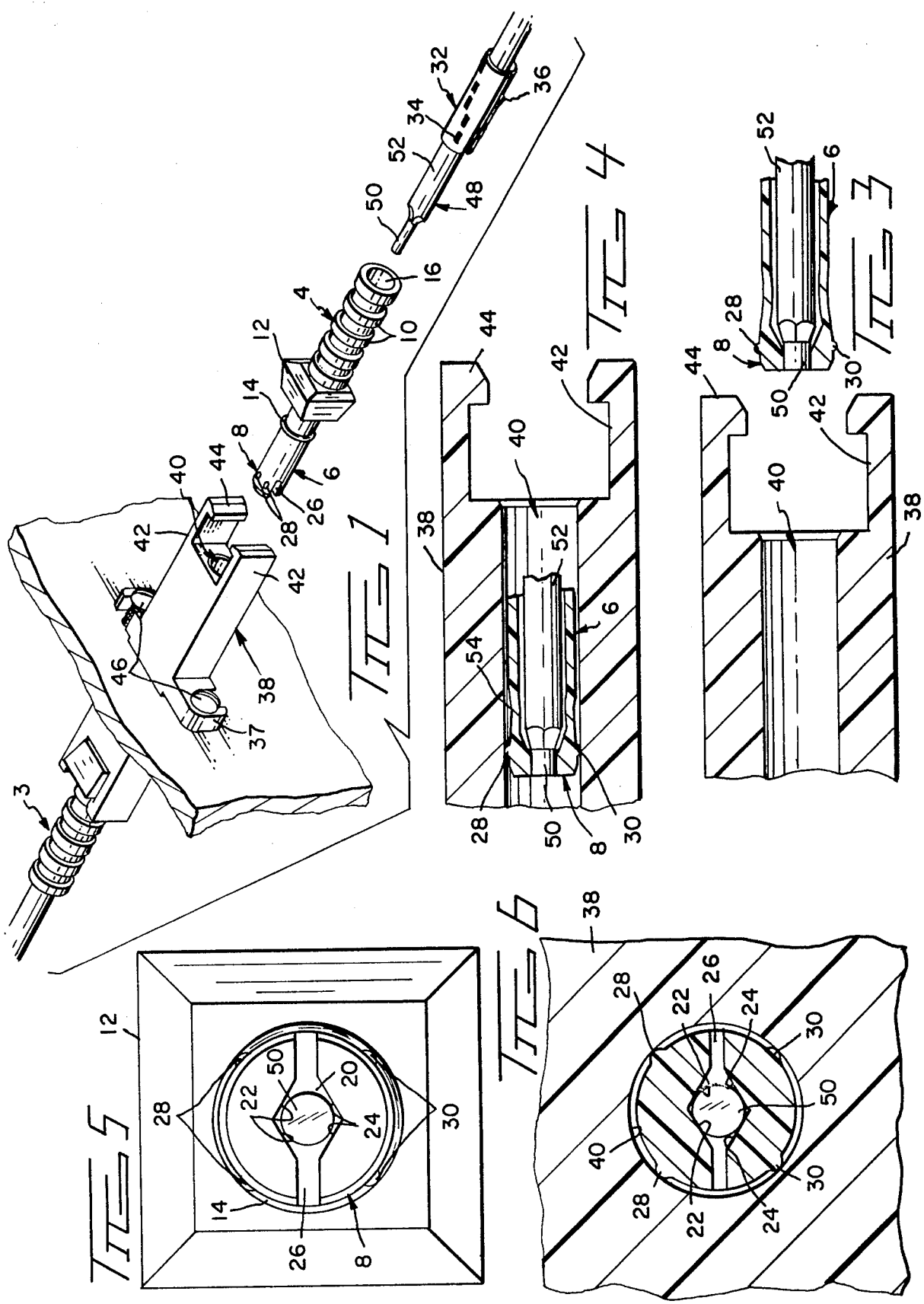

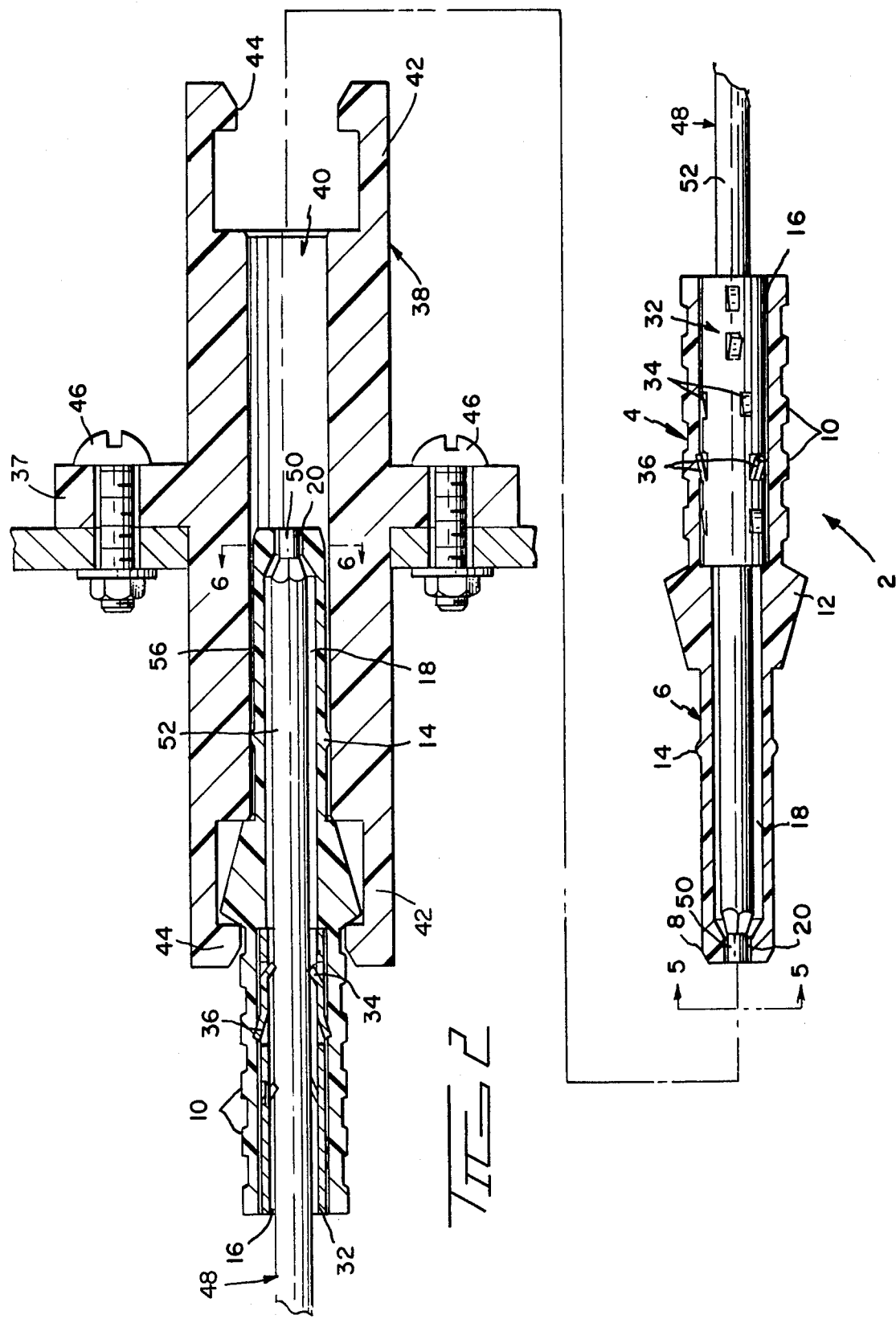

OPTICAL WAVEGUIDE CONNECTOR

BACKGROUND OF THE INVENTION

1. Field of the Invention

The present invention relates to optical fiber connections in general, and in particular to fiber connectors comprising a plug component which functions to axially locate a single optical fiber on the axis of a receptacle bore.

2. The Prior Art

Increased penetration of fiber optics technology into data distribution, and communications applications, has been primarily inhibited by cost factors. Presently available connectors for axially aligning a pair of fibers typically comprise multiple components which are relatively expensive to manufacture. Accordingly, it has been economically undesirable to convert hard wire distribution applications to fiber optic systems, partly due to the cost disadvantage of fiber optic connector components.

Moreover, presently available fiber optic connector technology requires that the end surface of the optical fiber be polished in order to achieve an efficient optical coupling. The polishing procedure further adds to the applied cost of the product, and presents problems in field applications. Also, state of the art connectors often require the use of specialized tooling in effectuating a fiber termination, and further require the use of adhesive materials for bonding the fiber to the connector unit. The inconveniences and expense of these requirements are obvious.

A further problem confronted by fiber optic connector technology is attributable to the fact that a variety of cable sizes exist in the industry. For example, the relatively large plastic fiber used in certain systems can range in size between 16 to 40 thousandths of an inch. Consequently, the connectors for terminating these fibers must accommodate this wide range of potential fiber sizes, which further complicates the achievement of a suitable connector system. To complicate matters further, the outer diameter of cladding which protects the fibers in a cabling structure, can also vary. Presently available connectors, because of their alignment techniques, have difficulty in accommodating the termination of the wide range of cable sizes which a user must confront in the optical cable world.

SUMMARY OF THE PRESENT INVENTION

The present invention relates to an inexpensive connector for axially aligning a pair of optical fibers, comprising a receptacle body having a bore extending therethrough, and a pair of plug members for intended opposed location within the receptacle bore. Each plug member is provided with an axial passageway receiving one fiber therein, and a forward alignment nose portion having a profiled opening for receiving a forward end of the fiber. The opening is defined by opposed V-grooves, with the upper and lower V-grooves separated by a transverse slot which extends through the alignment nose portion. The alignment portion of each plug member is further provided with exterior protrusions which are located to engage the receptacle body, causing radial compression of the V-grooves upon the fiber extending therebetween. Resultingly, the fiber is wedged between the V-groove surfaces, and is located on the axis of the receptacle bore. An annular, compressible flange is further provided to extend around each plug member, at a location axially rearward of the forward alignment portion of the plug. The annular flange likewise engages the receptacle to axially center the rearward portion of the plug member, and to environmentally seal the plug bore.

Accordingly, it is an object of the present invention to provide a connector for axially aligning a pair of optical fibers.

A further object of the present invention is to provide a connector capable of aligning a pair of optical fibers, having outer diameters variable within specified limits.

Yet a further object of the present invention is to provide a connector for optically coupling a pair of fibers, an important feature of which is having a unitary alignment plug.

A further object of the present invention is to provide an optical waveguide connector which requires no specialized tools in effectuating a fiber termination.

Still a further object of the present invention is to provide an optical waveguide connector for optically coupling a pair of optical fibers, and which obviates the need for polishing end surfaces of the fibers in effectuating the coupling.

A further object is to provide an optical connector suitable for terminating large diameter plastic fiber cables.

Yet a further object of the present invention is to provide an optical waveguide connector for coupling a pair of optical fibers without the need for adhesive materials.

In addition, it is an object of the present invention to provide an optical waveguide connector which is field appliable.

A still further object of the present invention is to provide a waveguide connector which is economically and readily produced.

These and other objects are achieved by a preferred embodiment which is described in detail below, and which is illustrated in the accompanying drawings.

BRIEF DESCRIPTION OF THE ACCOMPANYING DRAWINGS

FIG. 1 is an exploded perspective view of the subject connector plug, having an optical fiber and retention sleeve exploded therefrom. As indicated, the subject plug is intended for mating insertion into a bulkhead mounted receptacle.

FIG. 2 is a side elevation view of the subject optical waveguide connector, illustrating the receptacle component having one of two connector plug subassemblies inserted therein, and the other plug assembly exploded therefrom.

FIG. 3 is a partial side elevation view of the subject receptacle body, having the forward alignment portion of a plug member exploded therefrom. The plug member terminates an optical fiber of the type having a relatively larger diameter fiber core, and FIG. 3 illustrates the capability of the subject invention to terminate a fiber having a diametered size variable within a specified range of limits.

FIG. 4 is a partial side elevation view of the subject receptacle body, with the plug and larger diameter fiber illustrated in FIG. 3 inserted into the axial bore of the receptacle.

FIG. 5 is a frontal view of the subject connector plug, taken along the line 5—5 of FIG. 2.

FIG. 6 is a frontal view taken through the alignment nose portion of the subject connector plug, taken along the line 6—6 of FIG. 2.

DETAILED DESCRIPTION OF THE PREFERRED EMBODIMENT

Referring first to FIGS. 1 and 2, a pair of plug members 2,3 are shown to each comprise a rearward portion 4, an intermediate portion 6, and a forward alignment nose 8. The plug members are composed of substantially resilient plastic material, and both of the plug members 2,3 are structurally identical. A series of annularly directed, and axially spaced gripping flanges 10 are provided integral with the rearward portion 4 of the plug member. A somewhat larger, retention flange 12 is further provided and located between the rearward portion 4 and the intermediate portion 6 of each plug member. Extending annularly around the intermediate portion 6, is an alignment rib 14 which is located substantially equidistant from the ends of the intermediate portion 6. An axial bore extends through each of the plug members 2,3 and is comprised of a rearward bore 16, an intermediate bore 18, and a profiled opening 20 which projects through the alignment nose 8 of each plug member, and which communicates with the intermediate bore 18.

With reference to FIGS. 5 and 6, the forward profiled opening 20 through the alignment nose 8 is defined by upper convergent surfaces 22, which converge away from the opening, and a pair of lower convergent surfaces 24 which converge downward and away from the opening. A transverse slot 26 is further provided to extend through the forward alignment nose 8 of each plug member, and is located so as to separate the upper convergent surfaces 22 from the lower surfaces 24. Situated on the external surface of the forward alignment nose 8, are a pair of upper alignment protrusions 28, and a pair of lower alignment protrusions 30. The protrusions 28,30 are structured to be substantially resilient and compressible for a purpose to be explained in detail below. Further, it will be noted that the upper protrusions 28 are positioned to be diametrically opposed to corresponding lower protrusions 30, with the upper and lower protrusions 28, 30 being situated on opposite sides of the transverse slot 26.

Returning to FIG. 2, a tubular retention sleeve 32 is provided, structured to comprise a plurality of inwardly directed tines 34, and outwardly directed tines 36. It will be noted that the outwardly directed tines 36 project towards a rearward end of the retention sleeve 32, while the inwardly directed tines 34 project into the retention sleeve. The tubular retention sleeve 32 is composed of a suitable metallic composition, which provides springlike characteristics. Resultingly, the inward and outward projecting tines 34,36 function as cantilever springs for purposes explained below.

Proceeding with FIG. 2, a bulkhead mounted receptacle 38 is shown, having an axial passageway 40 extending therethrough. At opposite ends of receptacle 38, a pair of cantilever fingers 42 extend outwardly, and provide latching flanges 44 at the respective remote ends thereof. A mounting flange 37 is provided about receptacle 38, and receives a pair of mounting screws 46 therethrough to affix the receptacle to the bulkhead. The receptacle body 38 is preferably composed of plastics material.

In reference again to FIG. 1, the subject invention is intended to optically couple a pair of optical fiber cables 48, which are structured having an interior fiber 50, and an outer jacket layer 52. The inner fiber 50 of such cables is typically composed of plastics material of optical quality, and can vary in diametric size between 16 to 40 thousandths of an inch. The jacket layer 52 which surrounds the interior fiber 50 functions to protect the fiber from external forces. Since the subject invention is intended to accommodate a termination of optical cables having a substantially wide range of dimension, operation of the connector will first be described for a fiber having a relatively small diametric dimension, and subsequently, a description of the operation of the subject invention will be presented for a cable having an interior fiber of relatively larger diametric dimension.

Assembly and operation of subject connector proceeds as follows. With initial reference to FIG. 1, the optical fiber cable 48 is prepared for termination by removing the jacket layer 52 from a forward end of the fiber 50. Thereafter, the fiber cable 48 is inserted through the tubular retention sleeve 32, and the plug member 2 as shown in FIG. 2. It will be appreciated that the inwardly directed tines 34 of the retention sleeve resiliently exert engaging pressure on the jacket layer 52 of the cable. Subsequently, as shown in FIG. 2, the retention sleeve 32 is inserted into the rearward bore 16 of the plug member 2. So located, the fiber cable 48 projects through the intermediate bore 18, and the fiber 50 projects through the profiled opening 20 of the alignment nose 8.

In exerting a rearwardly directed axial tension into the optical fiber cable 48, the inward directed tines 34 are made to penetrate into the jacket layer 52 of the cable, to thereby mechanically engage the cable and inhibit rearward withdrawal of the cable from the retention sleeve. This axial tension further acts to draw the outward tines 36 of the retention sleeve 32 into penetrating engagement with the plug member rearward portion 4. Consequently, the retention sleeve is mechanically retained within the plug member, by operation of the outward directed tines 36. Likewise, the fiber optic cable 48 is mechanically retained within the retention sleeve 32 by operation of the inward directed tines 34.

With continued reference to FIG. 2, and additional reference to FIG. 5, the forward end of the fiber 50 projects through the profiled opening 20 of alignment nose 8. Thereafter, by a cutting technique common within the industry, the forward end surface of the fiber 50 is severed into a coplanar relationship with the forward end surface of the plug member 2. So located, the fiber cable 48 extends forward through the intermediate portion 6 of the plug member, and a small portion of the fiber 50 projects through the alignment nose 8 to a forward end of a plug member. As best illustrated in FIG. 5, the forward portion of the fiber 50 is loosely contained between the convergent surfaces 22 and 24 of the alignment nose 8. The plug member is in a condition for insertion into the receptacle 38, as shown in FIG. 2. As the plug member is inserted into the axial passageway 40 of the receptacle 38, the cantilever fingers 42 ride over the retention flange 12 of the plug member, to mechanically lock the plug member into an engaging relationship with the receptacle. As shown by FIG. 2, as the intermediate portion and the alignment nose portion of the plug member is inserted into the passageway 40, the protrusions 28,30 of the alignment portion 8, and the annular alignment rib 14 of the intermediate portion 6 of the plug member engage with the receptacle wall defining the passageway 40 and compress radially inward. The engagement between the alignment rib 14 and the receptacle wall serves to axially locate the plug member on the major axis of the passageway, and provides an environmental seal to prevent dust or contaminants from entering the plug bore. Further, engagement of the protrusions 28,30 of the nose portion serve to radially compress convergent surfaces 22 and 24 of the nose portion 8 about the fiber 50 as shown in FIG. 6.

From FIG. 6, it will be apparent that the compressible protrusions 28,30 engage the receptacle wall, and cause the surfaces 22 and 24 to wedge the optical fiber 50 therebetween. The transverse slot 26 accommodates radial movement of the surfaces toward the optical fiber. In wedging the fiber between surfaces 28 and 30, the fiber is thereby located on the major axis of the passageway of the receptacle. The presence of the transverse slot 26, and the compressible nature of the protrusions 28 and 30, operate to render the subject connector plug relatively insensitive to optical fiber dimensional variances.

From FIG. 2, the interior dimensions of the intermediate bore 18 are sufficiently large to accommodate receipt of optical cables having an outer diameter which may vary within a specified range. Also, the alignment nose 8 is structured to accommodate optical fibers having a diameter variable between 16 to 40 thousandths of an inch.

As will be recognized in viewing FIG. 2, the pair of plug members 2,3 are inserted into opposite ends of the passageway 40, and are brought into abutting opposition intermediate of the passageway. There located, the axis of the fibers 50 extending through the alignment nose portion of each plug member are in alignment on the major axis of the passageway 40, and an efficient optical coupling between two optical cables is thereby effectuated. It will be noticed that the body of the intermediate portion 6 does not frictionally engage the receptacle, but rather, an axial gap 56 exists between the annular alignment rib 14 and the protrusions 28,30 of the plug member. This gap reduces insertion friction and enables the plug to be inserted with minimal amount of insertion force required. Thus, the plug member achieves an alignment function solely by operation of the rib 14 and the protrusions on the alignment nose 8 of the plug member.

Referring now to FIGS. 3 and 4, each of the subject connector plugs, as stated previously, can accommodate receipt of an optical cable having a fiber diameter which is somewhat larger than the fiber illustrated in the preceding discussion. For purposes of illustration, a fiber of larger outer dimension is shown to project through the alignment portion 8 of the plug member in the manner described above. As shown in FIG. 3, the oversize fiber still projects freely, but with less clearance, through the opening in the nose portion of the plug member, prior to insertion of the plug member into the receptacle passageway. As the plug member is matingly inserted into the receptacle passageway as shown in FIG. 4, the protrusions 28 and 30 of the nose portion compressibly engage the receptacle wall of the passageway, to locate the optical fiber 50 on the axis passageway. In exerting radial force on the optical fiber at separated points of contact, an inward dimple 54 is created by flexed material of the plug. The dimple 54 extends annularly around the intermediate plug portion 6, and stress relieves the plug member from forces generated by the protrusions 28,30 and the alignment rib 14.

Thus, it would be appreciated that the subject invention described above comprises a connector plug of unitary configuration which is adapted to receive an optical cable having an interior bore and outer diameter dimension variable within limits. Further, no polishing is required when effectuating such a termination; nor is there a need for adhesive material in mechanically attaching the plug to the optical cables. Furthermore, since the termination of optical cable by operation of the subject invention requires no specialized tooling, it is therefore suitable for field applications. Lastly, the optical fiber connector is comprised of inexpensive-to-produce components which result in a connector of substantially lower manufacturing cost than currently available alternatives in the industry.

Referring to FIG. 2, it will also be appreciated that the retention ferrule 32 may be eliminated if so desired, without departing from the principles of the subject invention. Thereupon, the cable may be mechanically inserted into the plug member, and the forward grasping engagement of the nose portion relied upon for effectuating mechanical attachment of the cable to the plug member. Alternatively, the retention sleeve 32 may be eliminated, and replaced by a measure of adhesive material, of the type commonly available in the industry. Resultingly, the adhesive material would serve to securely attach the plug member to the optical cable.

While the above description of the subject invention is of a preferred embodiment, other embodiments which will be apparent to one skilled in the art, and which utilize the teachings set forth, are intended to be within the spirit of the subject invention.

What is claimed is:

1. A connector for connecting optical fiber means of fiber optic cable means in axial alignment, comprising:

receptacle means having bore means extending therethrough, said bore means having a substantially constant diameter surface means therealong;

plug means having nose means, intermediate means and rear section means, said nose means, said intermediate means and said rear section means having axial bore means extending therethrough along which the fiber optic cable means will extend, said axial bore means along said nose means having opposed upper and lower profiled fiber-grasping means for grasping the optical fiber means of the fiber optic cable means therebetween, said fiber-grasping means being separated by transverse slot means extending through said nose means;

said nose means and said intermediate means having a diameter slightly less than said constant diameter surface means of said bore means of said receptacle means so that said nose means and said intermediate means with the fiber optic cable means extending along said axial bore means and the optical fiber means grasped by said upper and lower profied fiber-grasping means can be positioned along said bore means with said nose means disposed adjacent one another; and protrusion means on said nose means and engagable with said surface means of said bore means to radially compress said fiber-grasping means onto the optical fiber means therein and axially align them.

2. A connector as set forth in claim 1, wherein said opposed upper and lower profiled fiber-grasping means have V-shaped surfaces.

3. A connector as set forth in claim 1, wherein said intermediate means have annular flange means sealingly engaging said surface means of said bore means.

4. A connector as set forth in claim 1, wherein said receptacle means and said plug means have latch means for latching said plug means to said receptacle means.

5. A connector as set forth in claim 1, wherein said axial bore means along said rear section means is larger, securing means for engagement with said axial bore means along said rear section means for securing the fiber optic cable means in said plug means.

6. A fiber optic connector for terminating an end of fiber optic cable means and for connection within a substantially constant diameter bore means of receptacle means, comprising:

plug means having nose means, intermediate means and rear section means, said nose means, said intermediate means and said rear section means having axial bore means extending therethrough along which the fiber optic cable means will extend, said axial bore means along said nose means having opposed upper and lower profiled fiber-grasping means for grasping the optical fiber means of the fiber optic cable means therebetween, said fiber-grasping means being separated by transverse slot means extending through said nose means; and protrusion means on said nose means and engageable with the substantially constant diameter bore means of the receptacle means when said nose means and said intermediate means are inserted into the bore means thereby radially compressing said fiber-grasping means onto the optical fiber means therein and axially aligning the optical fiber means therein.

7. A fiber optic connector as set forth in claim 6, wherein annular flange means is located on said intermediate means for sealing engagement with the bore means.

8. A fiber optic connector as set forth in claim 6, wherein said opposed upper and lower profiled fiber-grasping means have V-shaped surfaces.

* * * * *